United States Patent [19]
Hoshihara et al.

[11] Patent Number: 5,829,728
[45] Date of Patent: Nov. 3, 1998

[54] VEHICLE SEAT SLIDE MECHANISM

[75] Inventors: Naoaki Hoshihara, Aichi-ken; Hiroshi Tamura; Hisato Watanabe, both of Toyota, all of Japan

[73] Assignees: Aisin Seiki Kabushiki Kaisha, Kariya; Toyota Jidosha Kabushiki Kaisha, Toyota, both of Japan

[21] Appl. No.: 673,208

[22] Filed: Jun. 27, 1996

[30] Foreign Application Priority Data

Jun. 28, 1995 [JP] Japan .................................... 7-162419

[51] Int. Cl.⁶ ........................................................ B60N 2/02
[52] U.S. Cl. ........................ 248/429; 280/806; 296/68.1; 297/344.1
[58] Field of Search ..................................... 248/429, 430, 248/298.1; 296/63, 68.1; 297/344.1; 780/806

[56] References Cited

U.S. PATENT DOCUMENTS

| | | | |
|---|---|---|---|
| 3,711,056 | 1/1973 | Gmeiner et al. | 248/429 |
| 4,281,871 | 8/1981 | Grittner et al. | 248/429 X |
| 4,556,186 | 12/1985 | Langmesser, Jr. et al. | 248/429 |
| 4,961,559 | 10/1990 | Raymor | 248/429 |
| 5,242,144 | 9/1993 | Williams et al. | 248/429 |

FOREIGN PATENT DOCUMENTS

| | | |
|---|---|---|
| 2-31967 | 2/1990 | Japan . |
| 3-235724 | 10/1991 | Japan . |
| 5-1569 | 1/1993 | Japan . |

*Primary Examiner*—Derek J. Berger
*Attorney, Agent, or Firm*—Burns, Doane, Swecker & Mathis, LLP

[57] ABSTRACT

A vehicle seat slide mechanism for a vehicle includes a lower rail fixed to the vehicle floor, an upper rail attached to a seat and supported on the lower rail so as to be free to slide thereon, a locking plate disposed between the lower rail and the upper rail and operable to limit sliding motion of the upper rail relative to the lower rail and to free the upper rail from this limitation, an operating lever disposed underneath the seat for operating the locking plate, a converging first wall formed on the locking plate so as to be engageable with teeth, which are formed on the lower rail, in the direction in which the upper rail slides relative to the lower rail, the first wall being so adapted that the teeth assume a first position or a second position, and a second wall formed on the locking plate and capable of engaging the upper rail in the direction of locking plate movement when the teeth are at the second position.

5 Claims, 7 Drawing Sheets

5,829,728

VEHICLE SEAT SLIDE MECHANISM

BACKGROUND OF THE INVENTION

This invention relates to a seat slide mechanism for use in an automotive vehicle.

In general, a seat slide mechanism for use in an automotive vehicle includes a lower rail fixed to the floor of the vehicle, an upper rail attached to a seat and supported on the lower rail so as to be free to slide thereon, a locking plate supported on the upper rail and operable to limit sliding motion of the upper rail relative to the lower rail and to free the upper rail from this limitation, and an operating lever disposed underneath the seat on the front side thereof for operating the locking plate.

The lower rail has teeth which ordinarily are inserted into locking holes provided in the locking plate, whereby the teeth engage with the walls of the locking holes to limit the sliding motion of the upper rail relative to the lower rail and hold the seat at a predetermined position on the vehicle floor. The teeth on the lower rail are caused to disengage from the locking holes of the locking plate in response to operation of the locking plate by a seated individual manipulating the operating lever, whereby the limitation upon the sliding motion of the upper rail relative to the lower rail is removed so that the seat can be moved to a desired position on the vehicle floor.

Example of the seat slide mechanism of this type is disclosed in Japanese Utility Model Application Laid-Open (KOKAI) No. Hei 5-1569(1993).

With the slide mechanism described above, the limitation upon the sliding motion of the upper rail relative to the lower rail is removed by operation of the locking plate whenever the operating lever is manipulated, regardless of the circumstances. Consequently, if, say, an item of baggage placed on the vehicle floor is accelerated by sudden forward motion of the vehicle and strikes the operating lever, there is the danger that the lever will be operated.

SUMMARY OF THE INVENTION

Accordingly, an object of the present invention is to provide a vehicle seat slide mechanism so adapted that the operating lever will not be operated when the vehicle is accelerated.

According to the present invention, the foregoing object is attained by providing a seat slide mechanism for a vehicle, comprising a lower rail fixed to a floor of the vehicle, an upper rail attached to a seat of the vehicle and supported on the lower rail so as to be free to slide thereon, a locking plate disposed between the lower rail and the upper rail and operable to limit sliding motion of the upper rail relative to the lower rail and to free the upper rail from this limitation, an operating lever disposed underneath the seat on the front side thereof for operating the locking plate, a converging first wall formed on one of the upper rail, lower rail and locking plate engageable with an engaging portion, which is formed on the other of the upper rail, lower rail and locking plate, in the direction in which the upper rail slides relative to the lower rail, the first wall being so adapted that the engaging portion assumes a first position and a second position lying in a direction which substantially perpendicularly intersects the direction in which the upper rail slides relative to the lower rail. and a second wall formed on the locking plate and capable of engaging the upper rail or said lower rail in the direction of locking plate movement when the engaging portion is at the second position.

In a preferred embodiment of the invention, the locking plate is formed to have a notch contiguous to the second wall, the notch being so adapted that when the engaging portion is at the first position, the locking plate will not engage the upper rail or the lower rail in the direction of locking plate movement.

In operation, the upper rail attempts to slide on the lower rail when the vehicle is accelerated, as a result of which the engaging portion shifts from the first position to the second position owing to the converging first wall. This makes it possible for the second wall of the locking plate to engage with the upper rail or lower rail in the direction in which the locking plate is moved so that the motion of the locking plate will be limited by the engagement between the second wall and the upper rail or lower rail. As a result, it is impossible for the operating lever to be operated. Accordingly, it is less likely that the operating lever will be operated under sudden acceleration.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the accompanying drawings.

Figure 1:
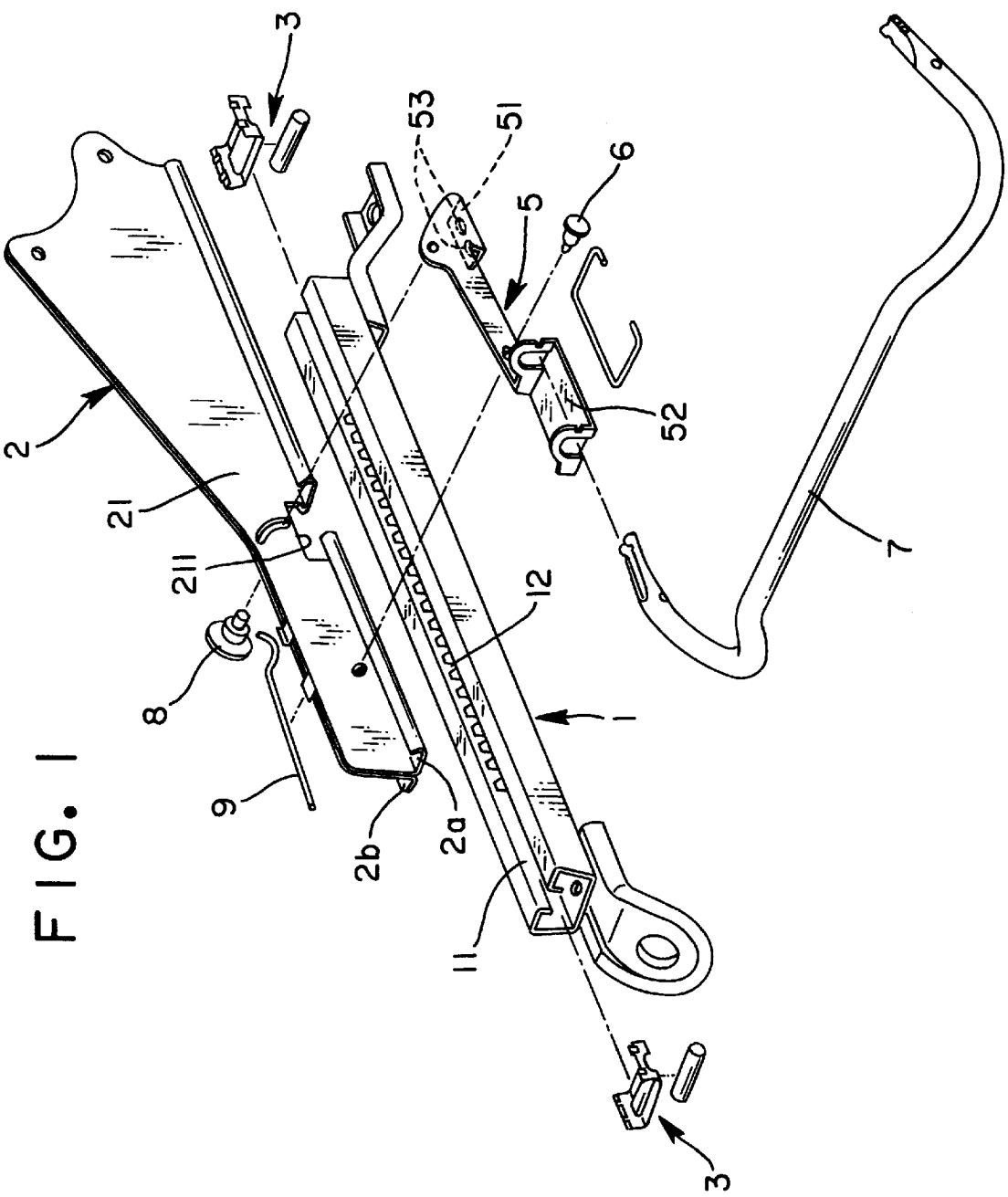
FIG. 1 is an exploded perspective view illustrating a vehicle seat slide mechanism according to an embodiment of the present invention.
Figure 2:
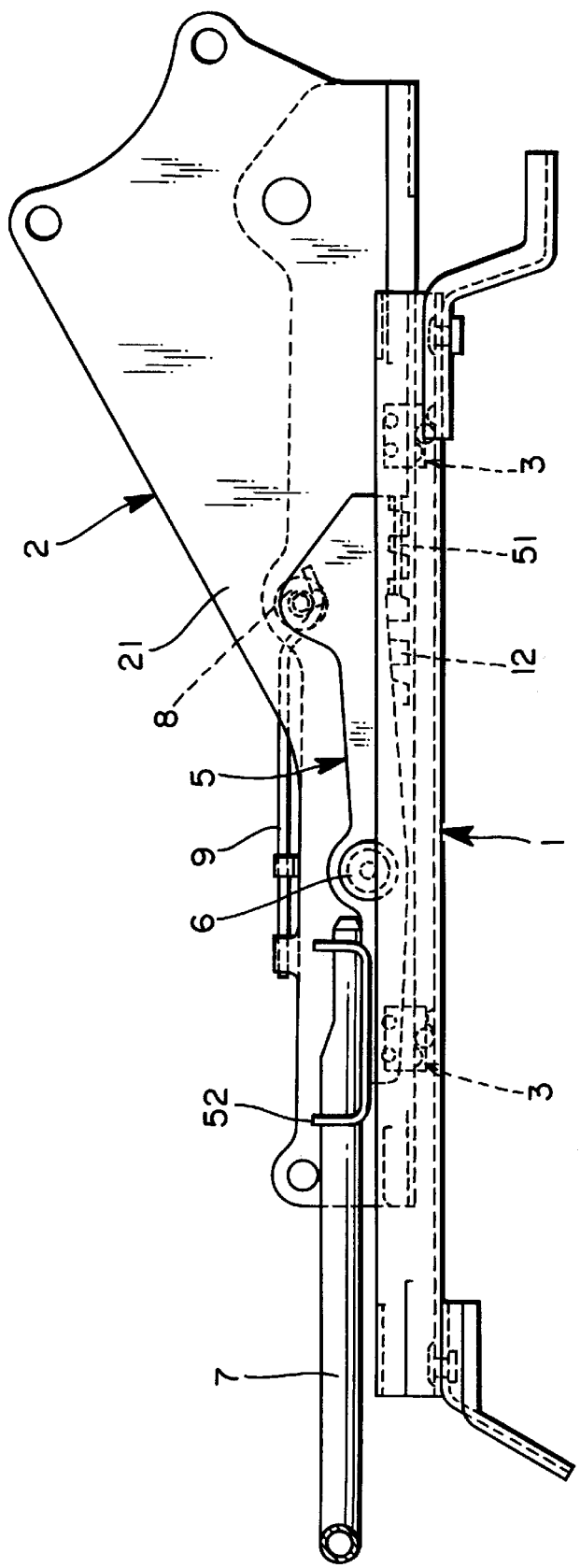
FIG. 2 is a plan view of the vehicle seat slide mechanism.
Figure 3:
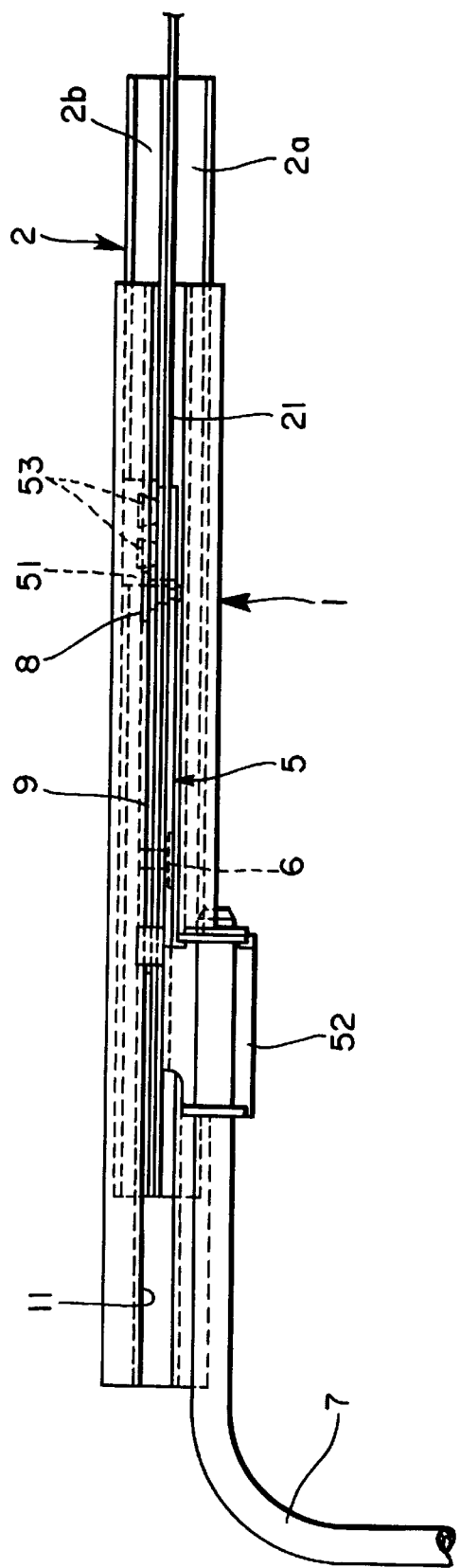
FIG. 3 is a top view of the vehicle seat slide mechanism.
Figure 4:
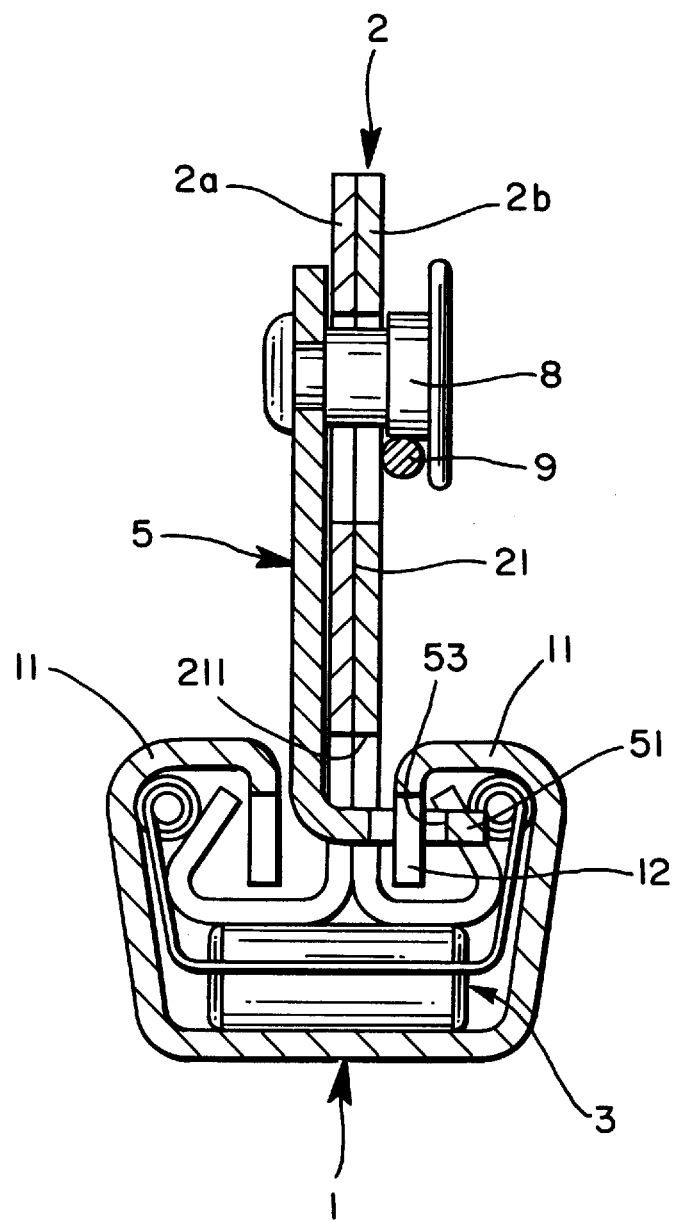
FIG. 4 is a sectional view of the vehicle seat slide mechanism shown in FIG. 2.

As shown in FIG. 1 and 4, a lower rail 1 is fixed to a vehicle floor (not shown). Though only one lower rail is illustrated, a second identical lower rail also is fixed to the floor so as to lie parallel to the illustrated lower rail 1. The lower rail 1 extends longitudinally of the vehicle and is formed from a single sheet of material bent into a prescribed shape, namely a generally U-shaped cross section.

A pair of parallel upper rails 2 (only one of which is shown) attached to respective sides of a seat (not shown) comprising a seat cushion and a seat back extend longitudinally of the vehicle and are supported slidably on the lower rails 1. Each upper rail 2 is obtained by bending two sheet members 2a, 2b into a prescribed shape, namely an inverted T-shaped cross section. The upper rail 2 is freely slidably supported on the lower rail 1, via a roller ball unit 3, by utilizing the cross-sectional shape of the rails 1 and 2.

Figure 5:
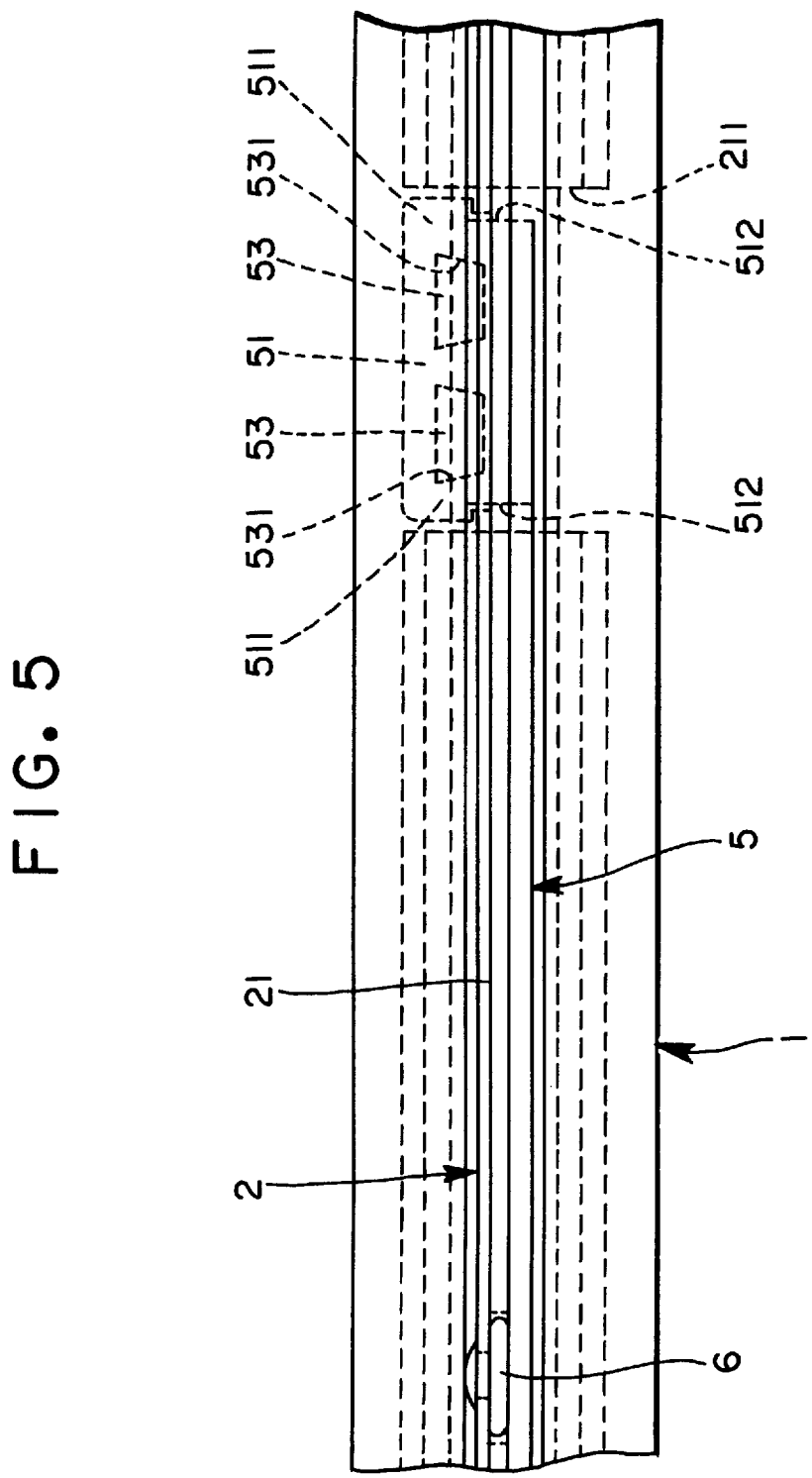
FIG. 5 is an enlarged plan view showing the principal portions of the vehicle seat slide mechanism according to this embodiment of the invention.
Figure 6:
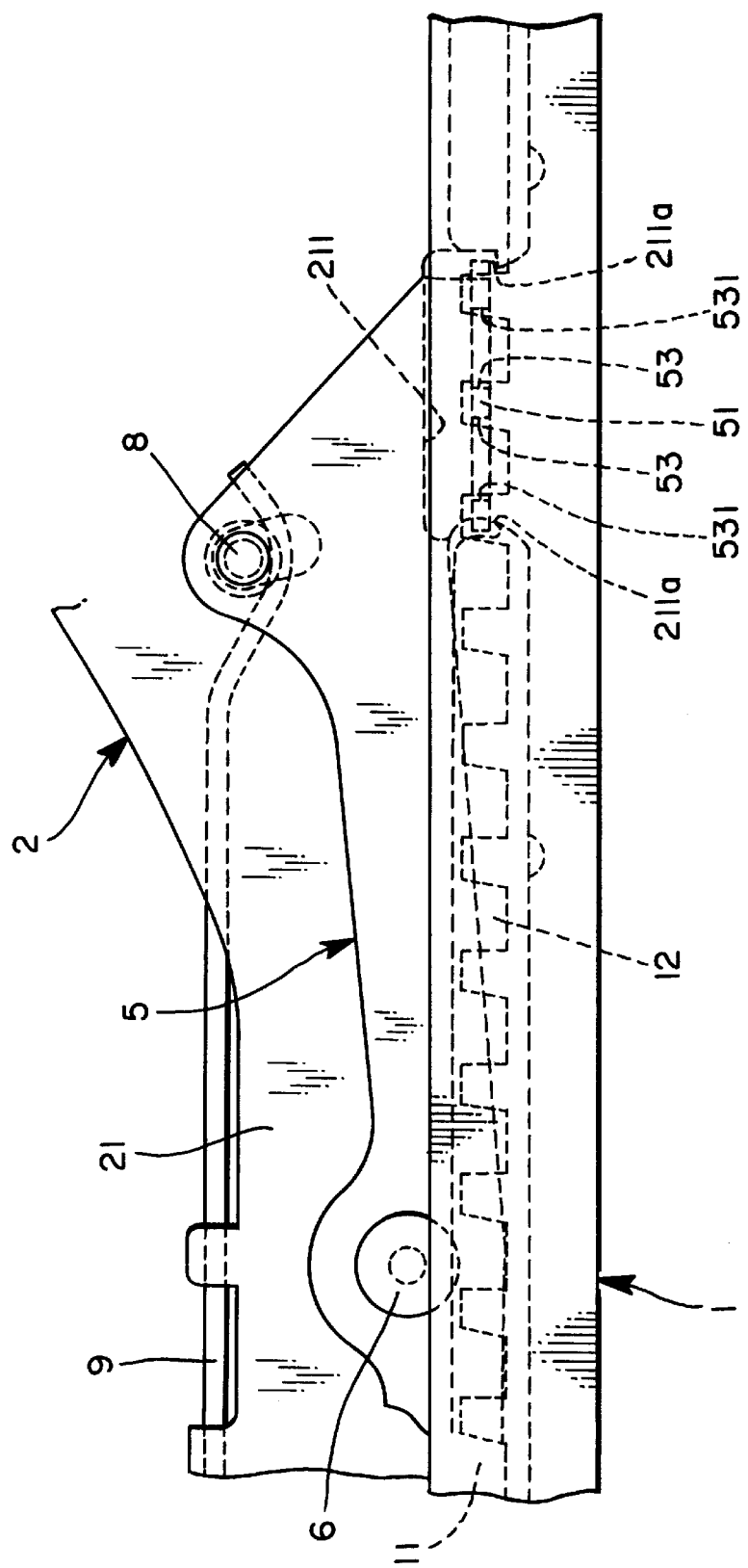
FIG. 6 is an enlarged top view showing the principal portions of the vehicle seat slide mechanism according to this embodiment of the invention.

As shown in FIGS. 4 through 6, each lower rail 1 has inwardly bent portions 11 the edge of which is formed to include a plurality of teeth 12 arranged in row extending longitudinally of the rail. Further, each upper rail 2 has an upstanding wall 21, which is formed by combining sheet members 2a, 2b. A locking plate 5 is supported on each upper rail 2 so as to be free to turn. The locking plate 5, which is disposed in parallel with the upstanding wall 21 of upper rail 2, is supported at its mid-section by a pin 6 so as to be free to turn. Of the two opposite ends of locking plate 5 on either side of pin 6, one end (the aft end) is formed to have a flange 51 extending transversely of the rail so as to lie perpendicular to the longitudinal direction of the rail. The flange 51 is arranged to penetrate a cut-out 211, which is formed in the upstanding wall 21 of the upper rail 2, so as to confront the teeth 12 of the lower rail 1. The other end of the locking plate 5 is formed to have a connecting portion 52 to which an operating lever 7, described below, is capable of being connected. The flange 51 is formed to have at least a pair of locking holes 53 into which the teeth 12 are capable of being inserted. Each locking hole 53 has a pair of mutually opposing first walls 531 which intersect the sliding direction of the upper rail 2 relative to the lower rail 1, namely the longitudinal direction of the rails. Furthermore, the locking plate 5 consists of a deformable material for the purpose of allowing movement of the flange 51 transversely of the rails. This deformation may be achieved for plastic deformation or elastic deformation.

As shown in FIGS. 1 through 4, the operating lever 7 has a loop-shaped configuration, both ends of the lever being passed through the connecting portions 52 of the respective locking plates 5 so as to be connected to the locking plates 5. The central portion of the operating lever 7 is situated below the seat along the front side thereof so as to be capable of being operated by a seated individual. Further, a rod-shaped spring 9 is disposed between the locking plate 5 and the upper rail 2. One end of the rod-shaped spring 9 is fastened to the upstanding wall 21 of the upper rail 2, and the other end of the spring 9 is fastened to one end of the locking plate 5 via a pin 8. As a result, the locking plate 5 is acted upon by the biasing force of the spring 9 in such a manner that the locking plate is forcibly turned at all times in a direction in which the teeth 12 are inserted into the locking holes 53.

In the arrangement described above, the teeth 12 are inserted into the locking holes 53 owing to the fact that the locking plate 5 is constantly biased by the rod-shaped spring 9 so as to turn in a first direction. The sliding motion of the upper rail 2 relative to the lower rail 1 is limited owing to the engagement between the inserted teeth and the walls 511 of the locking holes 53. As a result, the seat is held in a predetermined position on the floor of the vehicle. If the operating lever 7 is operated by being pulled up, the locking plate 5 is turned in a second (opposite) direction against the urging force of the rod-shaped spring 9 and the teeth 12 are disengaged from the locking holes 53. As a result, the mechanical limitation upon the sliding motion of the upper rail 2 relative to the lower rail 1 is removed so that the upper rail 2 is capable of being slid on the lower rail 1. This means that the seat can be moved longitudinally of the vehicle to a desired position on the vehicle floor. When the operating lever 7 is released, the locking plate 5 is acted upon by the biasing force of the spring 9 and is turned in the first direction so that the teeth 12 are inserted into the locking holes 53 again, thereby limiting the sliding motion of the upper rail 2 on the lower rail 1.

Figure 7:
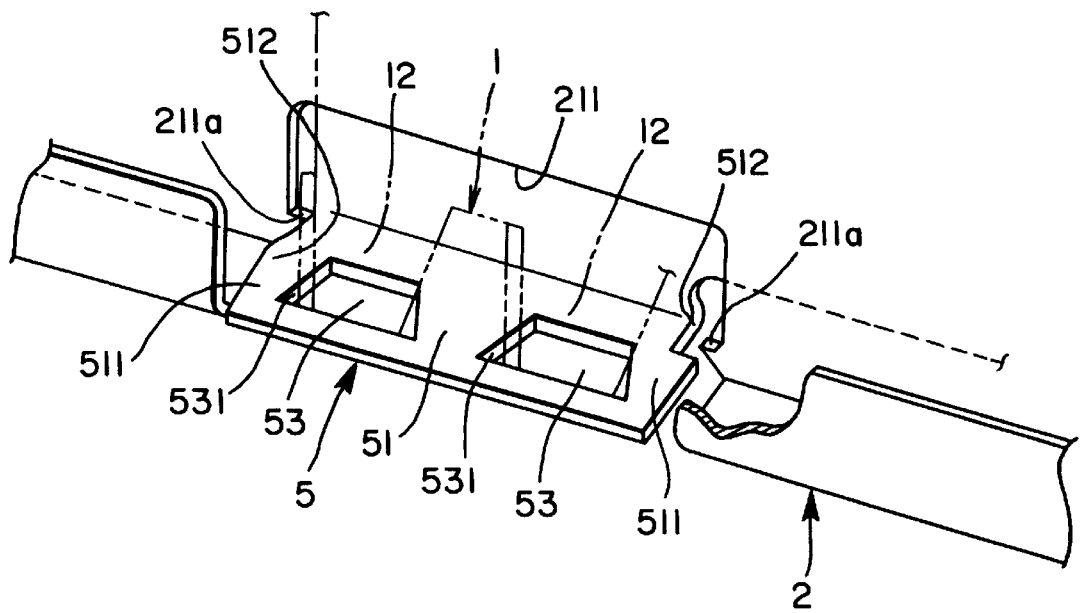
FIG. 7 is a perspective view showing the principal portions of the vehicle seat slide mechanism according to this embodiment of the invention.
Figure 8:
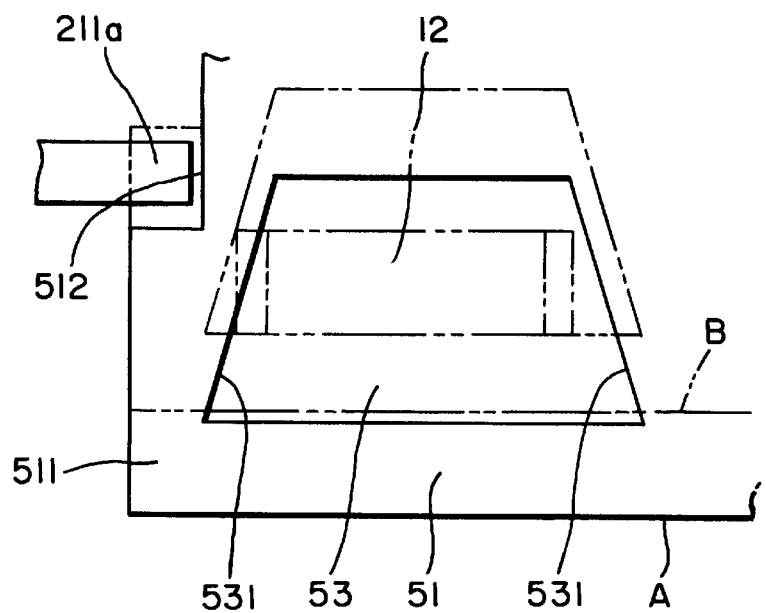
FIG. 8 an explanatory view illustrating the operation of a locking plate under acceleration, the locking plate being a component of the vehicle seat slide mechanism according to the present invention.

As shown in FIGS. 7 and 8, each locking hole 53 has a trapezoidal shape. The first walls 531, which intersect the longitudinal direction of the rails, each have a length transversely of the rails that is greater than the plate thickness of the teeth 12. The first walls 531 converge in such a manner that the width of each locking hole 53 longitudinally of the rails is greater on the outer side longitudinally of the rails than on the inner side longitudinally of the rails. As a result, a first position A and a second position B, at which the teeth 12 can be located with respect to the locking hole 53, are situated along a direction that perpendicularly intersects the sliding direction of the upper rail 2 relative to the lower rail 1, namely the transverse direction of the rails. Further, the opposing ends of the flange 51 of locking plate 5 longitudinally of the rails are each formed to have a second wall 511, which protrudes longitudinally of the rails, and a notch 512 contiguous to the second wall 511. Furthermore, the longitudinally opposing walls of the cut-out 211 of upper rail 2 penetrated by the flange 51 of the locking plate 5 are each formed to have a finger 211a engageable with the second wall 511 of flange 51 in the operating direction of the locking plate 5 and insertable into the notch 512 of flange 51. The second wall 511 and the notch 512 are disposed transversely of the rails. The insertion of the finger 211a in the notch 512 takes place when the teeth 12 are at the first position A, and the engagement between the second wall 511 and the finger 211a takes place when the teeth 12 are at the second position B.

In the arrangement described above, the teeth 12 usually are at the first position A and the finger 211a is inserted into the notch 512, as indicated by the solid lines in FIG. 8. Accordingly, if the operating lever 7 is operated in the manner set forth above, the above-described turning of the locking plate 5 against the biasing force of the rod-shaped spring 9 is allowed.

If acceleration in excess of a predetermined value acts upon the vehicle longitudinally thereof, as when the vehicle is suddenly accelerated from rest, the teeth 12 engage strongly with the first walls 531 on the sides of the locking holes 53 opposite the direction in which the vehicle is accelerated. As a result, the flange 51 moves inward transversely of the rails owing to the converging configuration of the first walls 513 and the deformation of the locking plate 5, the teeth 12 assume the second position B and the fingers 211a engage with the second walls 511. This is as indicated by the phantom lines in FIG. 8. As a result, even if an attempt to operate the operating lever 7 in the above-mentioned manner is made under these conditions, the locking plate 5 cannot turn against the biasing force of the rod-shapes spring 9 owing to the engagement between the second wall 511 and finger 211a. This means that the operating lever 7 also will not operate.

Thus, when acceleration in excess of a predetermined value acts upon the vehicle, the motion of the locking plate 5 is limited and the operating lever 7 is rendered inoperable. Accordingly, even if an item of baggage lying on the vehicle floor should happen to move under acceleration and strike the operating lever 7, the latter will not operate.

It should be noted that only the first wall 531 on the fore side of the locking hole 53 or only the first wall 531 on the aft side of the locking hole 53 longitudinally of the rails need be made to converge toward the other wall. Of course, the first walls 531 on both the fore and aft sides of the locking hole maybe made to converge toward each other, as described above. Further, the converging wall 531 need not be part of the locking hole 53 but may be provided in the tooth 12 in the thickness direction thereof (the direction which perpendicularly intersects the longitudinal direction of the rails).

In accordance with the present invention, an engaging portion of the upper rail or lower rail shifts from a first position to a second position owing to the converging configuration of a first wall on a locking plate. The locking plate is formed to have a second wall for engaging with the upper rail or lower rail in the direction of locking plate movement when the engaging portion is at the second position. As a result, when the vehicle accelerates, the motion of the locking plate is checked by the engagement between the second wall and the upper rail or lower rail. Accordingly, it is less likely that the operating lever will be operated under sudden acceleration. In addition, this can be achieved without increasing the number of parts over that of the conventional mechanism, thus making it possible to hold down cost.

Further, in accordance with the present invention, the locking plate is formed to have a notch contiguous to the second wall. When the engaging portion is in the first position, the locking plate will not engage the upper rail or lower rail in the direction of locking plate movement. Operation of the locking plate in the absence of acceleration can thus be assured.

As many apparently widely different embodiments of the present invention can be made without departing from the spirit and scope thereof, it is to be understood that the invention is not limited to the specific embodiments thereof except as defined in the appended claims.

What is claimed is:

1. A seat slide mechanism for a vehicle, comprising:

a lower rail fixable to a floor of a vehicle;

an upper rail attachable to a seat of the vehicle and supported on said lower rail so as to be free to slide on the lower rail;

a locking plate disposed between said lower rail and said upper rail and operable to engage said upper rail or lower rail to limit sliding motion of said upper rail relative to said lower rail and to be disengaged from said upper rail or lower rail to permit sliding motion of said upper rail relative to said lower rail;

an operating lever operatively associated with the locking plate for operating said locking plate to permit sliding motion of said upper rail relative to said lower rail;

a converging first wall formed on said locking plate to engage an engaging portion formed on one of said upper rail and lower rail in the direction in which said upper rail slides relative to said lower rail, said first wall being configured to cause said engaging portion to move from a first position to a second position in a direction which substantially perpendicularly intersects the direction in which said upper rail slides relative to said lower rail; and a second wall formed on said locking plate for engaging a part of said upper rail or lower rail when said engaging portion is at said second position to prevent movement of the locking plate.

2. The mechanism according to claim 1, wherein said locking plate is provided with a notch positioned on one side of the locking plate adjacent to said second wall, said notch being so adapted that when said engaging portion is at said first position, said locking plate will not engage said part of the upper rail or lower rail in the direction of locking plate movement.

3. A seat slide mechanism for a vehicle comprising:

a pair of lower rails fixable to a floor of a vehicle and arranged in parallel with each other;

a pair of upper rails each supported slidably on one of the lower rails for supporting a seat of the vehicle; and locking means operable to limit sliding motion of the upper rail with respect to the lower rail; the locking means including teeth formed on each lower rail, swingable locking plates each being engageable with corresponding teeth through holes formed on each locking plate, and at least one finger formed on each upper rail for engaging a flange provided on each locking plate when the locking plate is slid transversely with respect to a sliding direction of the upper rail to maintain engagement of the teeth and the teeth through holes and thereby limit sliding motion of the upper rail with respect to the lower rail.

4. The mechanism according to claim 3, wherein said teeth through holes are provided in the flange of each locking plate, the teeth through holes being defined by opposed converging walls.

5. The mechanism according to claim 4, wherein the locking plates are forced to be transversely moved by contact of the converging walls and the teeth upon sudden acceleration of the vehicle.

* * * * *